Patented Mar. 17, 1942

2,276,564

UNITED STATES PATENT OFFICE 2,276,564

TRIMETHYLOLNITROMETHANE, METHOD OF PURIFICATION

Richard F. B. Cox, Wilmington, Del., assignor to Hercules Powder Company, Wilmington, Del., a corporation of Delaware No Drawing. Application October 25, 1939, Serial No. 301,231

6 Claims. (Cl. 34—31)

This invention relates to a method of removing free formaldehyde from trimethylolnitromethane.

Trimethylolnitromethane is a solid alcohol prepared by the condensation of nitromethane with formaldehyde. Its preparation by various procedures from these ingredients is well known in the art. The trimethylolnitromethane obtained by most of the procedures contains occluded formaldehyde which persists in the final product. The only procedure of drying trimethylolnitromethane disclosed in the literature involves drying the material in a desiccator over sulfuric acid. Although such a procedure effectively dries the material, it does not remove the occluded formaldehyde unless continued for an extremely long time. The procedure would be entirely impractical for a commercial process. Free formaldehyde is undesirable in trimethylolnitromethane, particularly when the latter is to be nitrated to provide explosive compositions. It affects the stability of the nitrated product and is otherwise undesirable.

Thus, no satisfactory procedure for removing occluded formaldehyde from trimethylolnitromethane has been known. As is well known, trimethylolnitromethane is sensitive to heat, and heating for one hour at 100° C. will cause the material to decompose and turn dark brown. Therefore, heating to remove the formaldehyde is impractical.

It is an object of this invention to dry and at the same time remove occluded formaldehyde from trimethylolnitromethane by a procedure which is commercially feasible and which does not decompose the material. Other objects will appear hereinafter.

The above objects are accomplished in accordance with this invention by drying trimethylolnitromethane containing occluded formaldehyde in a current of an inert gas circulated over the material at a temperature within the range of about 20° C. to about 70° C. and preferably within the range of about 40° C. to about 50° C. until the formaldehyde is completely removed. By such a treatment, the trimethylolnitromethane does not decompose and the occluded formaldehyde is completely removed, thereby providing a satisfactory product for nitration.

The treatment may be carried out conveniently in a mechanical convection oven or a drum drier with a current of warm gas or in a rotary drier with a countercurrent of warm gas. The time required to remove the formaldehyde will vary with such factors as the temperature employed, the rate of flow of the drying gas, the rate of removal of formaldehyde from the gas if it is recirculated, the state of aggregation of the trimethylolnitromethane crystals, the amount of mixing of the crystals, etc. Agitation of the crystals and rapid flow of the gas over the crystals have been found to be advantageous.

Warm air is preferred as the circulating gas, although other inert gases which have no effect on the materials may be employed, such as, for example, nitrogen, carbon dioxide, etc.

As an example of carrying out this invention, the crude trimethylolnitromethane reaction product prepared by condensing one mole of nitromethane with three moles of aqueous formalin, concentrating the solution and crystallizing at about 15° C., may be used. This rer :tion product, containing 2.1% of occluded formaldehyde, was treated by passing warm air over the material in a mechanical convection oven at a temperature of about 50° C. for about 16 hours, the air moving through the oven at a rate of substantially 2 feet per second. As a result the trimethylolnitromethane was freed completely of the occluded formaldehyde. Further purification of the trimethylolnitromethane, for example, by recrystallization from a suitable solvent, may be carried out after the above treatment. The treatment in accordance with this invention to remove occluded formaldehyde may be effectively carried out on trimethylolnitromethane either before or after recrystallization. Crystallization from solvents does not remove the occluded formaldehyde.

By carrying out the above treatment for removal of formaldehyde at a temperature of about 70° C. the formaldehyde was completely removed in about 6 hours.

The trimethylolnitromethane obtained in each of the above described treatments showed no evidences whatever of decomposition and was satisfactory for any of the uses of the material, being advantageous in such uses to the material containing occluded formaldehyde.

It will be understood that the details and examples hereinbefore set forth are illustrative only and that the invention as herein broadly described and claimed is no way limited thereby.

What I claim and desire to protect by Letters Patent is:

1. The method of removing occluded formaldehyde from trimethylolnitromethane containing the same which comprises circulating a current consisting essentially of an inert gas over the material at a temperature within the range of about 20° C. to about 70° C. for a period of time beyond that required to remove moisture from the material and sufficient to remove substantially all the occluded formaldehyde.

2. The method of removing occluded formaldehyde from trimethylolnitromethane containing the same which comprises circulating a current consisting essentially of an inert gas over the material at a temperature within the range of about 40° C. to about 50° C. for a period of time beyond that required to remove moisture from the material and sufficient to remove substantially all the occluded formaldehyde.

3. The method of removing occluded formaldehyde from trimethylolnitromethane containing the same which comprises circulating a current consisting essentially of an inert gas over the material at a temperature within the range of about 20° C. to about 70° C. at a rate of substantially two feet per second for a period of time beyond that required to remove moisture from the material and sufficient to remove substantially all the occluded formaldehyde.

4. The method of removing occluded formaldehyde from trimethylolnitromethane containing the same which comprises circulating a current consisting essentially of air over the material at a temperature within the range of about 20° C. to about 70° C. at a rate of substantially two feet per second for a period of time beyond that required to remove moisture from the material and sufficient to remove substantially all the occluded formaldehyde.

5. The method of removing occluded formaldehyde from trimethylolnitromethane containing the same which comprises circulating a current consisting essentially of warm air over the material at a temperature within the range of about 40° C. to about 50° C. at a rate of substantially two feet per second for a period of about sixteen hours.

6. The method of removing occluded formaldehyde from trimethylolnitromethane containing the same which comprises circulating a current consisting essentially of warm air over the material at a temperature of about 70° C. for a period of about six hours.

RICHARD F. B. COX.